(No Model.) 2 Sheets—Sheet 1.
H. C. LOWRIE.
PERMUTATION PADLOCK.
No. 512,979. Patented Jan. 16, 1894.
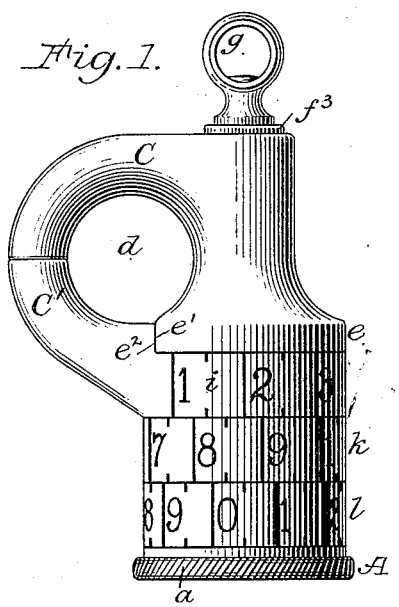
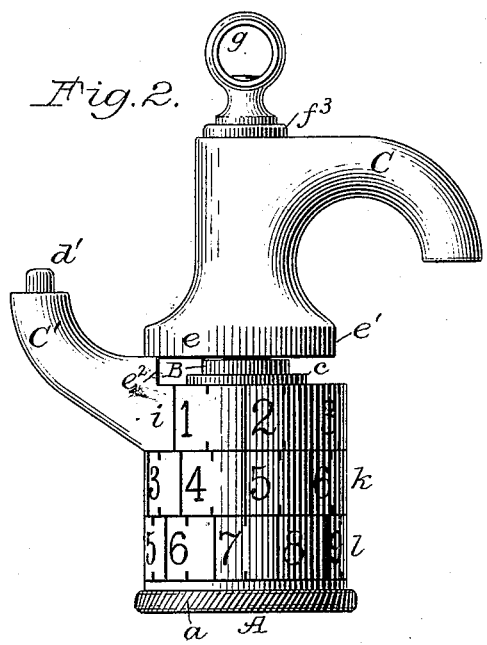
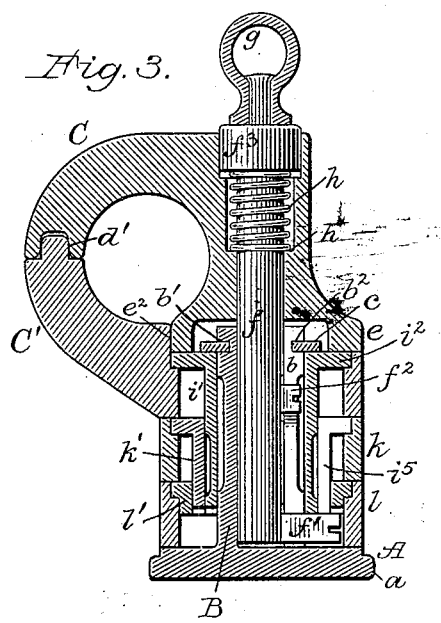
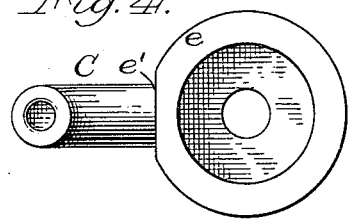
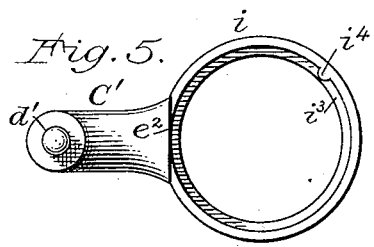
Attest:
Philip F. Larner
Howell Bartle
Inventor:
Harvey C. Lowrie
By ..... Attorney (No Model.) 2 Sheets—Sheet 2.
H. C. LOWRIE.
PERMUTATION PADLOCK.
No. 512,979. Patented Jan. 16, 1894.
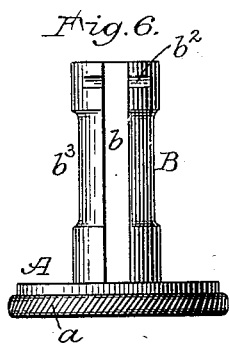
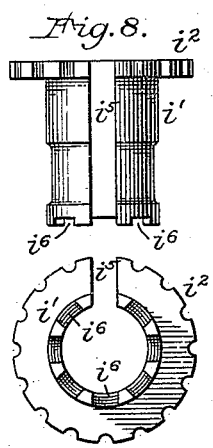
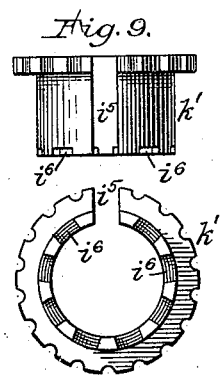
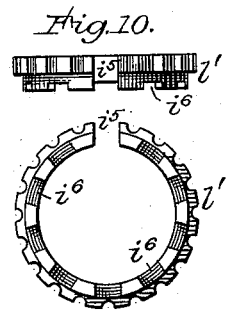
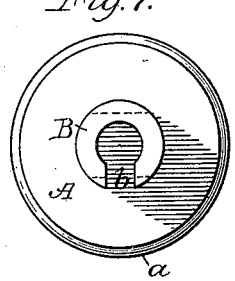
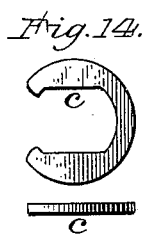
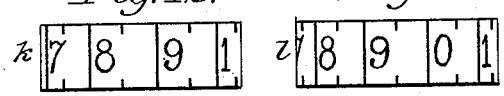
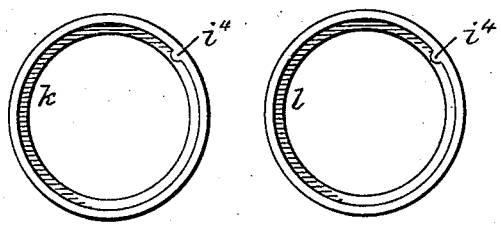
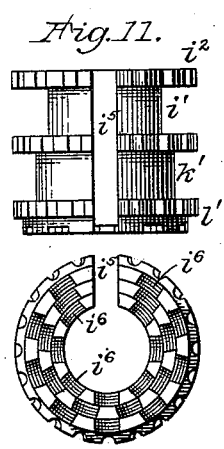
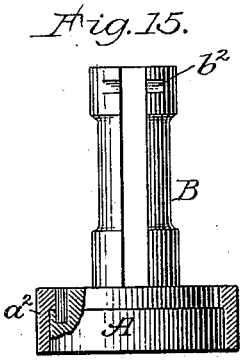
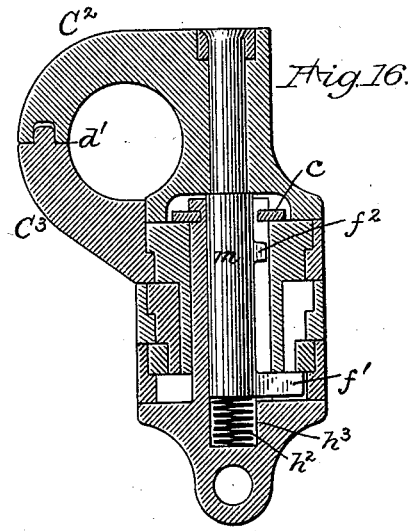
Attest:
Philip F. Larner
Lowell Lartle
Inventor:
Harvey C. Lowrie
By Wm C Mora
Attorney
THE NATIONAL LITHOGRAPHING COMPANY,
WASHINGTON, D. C.

UNITED STATES PATENT OFFICE.

HARVEY C. LOWRIE, OF DENVER, COLORADO.

PERMUTATION-PADLOCK.

SPECIFICATION forming part of Letters Patent No. 512,979, dated January 16, 1894.

Application filed April 19, 1893. Serial No. 471,015. (No model.)

*To all whom it may concern:*

Be it known that I, HARVEY C. LOWRIE, of Denver, in the county of Arapahoe and State of Colorado, have invented certain new and useful Improvements in Permutation-Padlocks; and I do hereby declare that the following specification, taken in connection with the drawings furnished and forming a part of the same, is a clear, true, and complete description of my invention.

In locks of the class named, as heretofore devised by me, I have employed in connection with a longitudinally and rotatively movable hasp, a hasp horn which is non rotative with reference to the body of the lock, and one object of my present invention, is to provide for the rotation of the hasp horn, and to secure among other advantages, a capacity on the part of the base of the horn, to serve as an actual working ring.

Another object of my present invention, is to practically avoid the undue wear of the surfaces of the working rings which are in contact with locking studs, and to further render it practically impossible, to secure an unlocking registration of the working rings by surreptitious feeling; also, to provide for locking the working rings against rotation, by persons unfamiliar with the lock mechanism, when the lock is in use; also to secure in a lock of this class, a capacity for failing to unlock, upon the mere registration with each other, of the appropriate numerals or figures on the working rings.

Still other objects of my invention, pertain to economical manufacture of parts, and to their assemblage, as well as to providing for strengthening the hasp against surreptitious rotation, and also to afford as between the hasp and its shank, a reliable union, but nevertheless to admit of a movement of either with respect of the other, longitudinally, under the action of a spring, which exercises control over both the hasp and its shank.

To more particularly describe my said invention I will refer to the accompanying drawings, in which—

Figures 1 and 2, illustrate one of my locks in side view, respectively closed, and opened or unlocked, said lock embodying my complete invention. Fig. 3, is a central vertical section of said lock. Fig. 4, is a bottom view of the hasp detached. Fig. 5, is top view of the hasp horn, and its base. Fig. 6, is a side view of the base of the lock, and a central tube which is or may be, a part of said base. Fig. 7, is a top view of the said base and said tube. Figs. 8, 9 and 10, are each, side and bottom views of the inner detachable and adjustable portions of the working rings of the lock, said portions being the active or effective parts of the outer, or inscribed portions of said rings. Fig. 11, illustrates in two views, the parts which are separately shown in Figs. 8, 9 and 10, as when nested together within the lock. Figs. 12 and 13, illustrate in side and bottom views, the outer or inscribed portions of two of the working rings. Fig. 14, illustrates the locking device, by means of which the union of the rings and the hasp is effected with the central tube. Fig. 15, illustrates a modification of the construction of the exterior portions of the base of the lock. Fig. 16, in central section, illustrates one of my locks in a desirable form, embodying certain valuable portions of my present invention.

In describing the lock Figs. 1 to 14, inclusive, I will first consider its several parts, and their relations with respect of each other, and then I will specially describe the modes of operation involved, with the several ends attained thereby.

The foundation element of this lock, is the base A, and the central tube B, which may be a separate, but firmly attached piece, although preferably integral with the base A, as shown. The base A, has usually a milled edge $a$, and sometimes a register mark, or score, is on said edge, but in some cases, it is desirable that it be provided with a separate but variably adjustable rim as at $a^2$, Fig. 15, which may be provided at its periphery, with letters or numerals, so as to enable the base to operate more fully as a working ring, as will be hereinafter clearly indicated. The central tube B, is longitudinally slotted at one side, as shown at $b$, and near its top, its two sides are transversely grooved as at $b'$, and $b^2$, for the reception of the two arms of a securing device, clip or yoke $c$, fully shown separately in Fig. 14, and also shown in its proper position, in Fig. 3. The central exterior portion of the tube B, may be annularly recessed, as at $b^3$, so as to restrict if desired, the area of the contact surfaces between said tube, and the interior tubular portion of a working ring, which is immediately concentric therewith.

The hasp C, and the hasp horn C', afford a suitable shackle opening as at $d$, their interlocking ends being provided with a socket and tenon, as at $d'$. The hasp C, has a base $e$, which is annular, except as to one of its sides, this being squared off as at $e'$, so that when the hasp is in its locked position, this squared portion will be coincident with a similar straight surface $e^2$, on the base and at the foot of the hasp horn, at its inner side, thus strengthening the hasp, and preventing the opening of the lock, even if the tenon connection at $d'$, should be sawed apart. It is obvious, that either of these bases may be provided with a recess, and the other provided with a projection which will occupy such recess, the object being to provide abutting surfaces, which will lock both bases against independent rotation, while occupying the same plane.

The hasp C, has within the central tube, a hasp shank $f$, upon which the hasp is rotative, but said shank is also capable of rotation, while the hasp is non-rotative. At or near the end or foot of the shank, it is provided with a lateral locking stud $f'$, which in one sense, might, in connection with said shank, be termed the bolt of the lock, and this stud always occupies the slot $b$, in the central tube. The hasp shank is also provided with a lateral stop stud $f^2$, located between the locking stud $f'$, and the base of the hasp, as clearly indicated, so that while said shank may at times be freely moved longitudinally in the central tube, it is restricted as to withdrawal, by the contact of said stop stud, with the under side of a portion of the yoke $c$, which is detachably secured to said tube near its top. The top of the hasp shank, is provided with an annular head $f^3$, which occupies a recess in the hasp, said head being surmounted usually, with a swiveled eye $g$, with which a chain connection may be made, as is often desirable with padlocks. The hasp and shank are mutually controlled by an expansive spiral spring $h$, which incloses a portion of the shank, and is housed within a recess in the hasp, so that the ends of the spring abut or take bearing, respectively against the under side of the shank head $f^3$, and the inner end of the recess, as at $h'$.

The hasp horn base $i$, is so organized that it serves as a working ring, its exterior surface being graduated by registering line marks, and provided with letters, or numerals, as shown. When said base is considered as a working ring, it is complex, in that it is composed of two parts or portions, one exterior, and the other interior, the latter portion $i'$, being separately constructed, in the form of a longitudinally slotted tube, having at one end a flange, as at $i^2$, notched at its periphery, so that when said flange occupies an annular recess as at $i^3$, in the horn base $i$, some one of said notches, may be occupied by a lug $i^4$, on said base, as is clearly indicated in Figs. 3, 5 and 8.

The slot $i^5$, in the tubular portion of the ring, affords the requisite gating for occupation by the locking stud, as during the release of the hasp. The small end of the tube, affords what may be termed the working surface of the ring, in that it is the part that engages with the locking stud, and said surface is provided with numerous radial recesses $i^6$, which serve as false notches, each being as wide as the gating slot, and of less depth than the tenon and socket connection $d'$, between the tip of the hasp and the hasp horn.

The two working rings $k$, $k'$, and $l$, $l'$, are substantially like that already described, but differ from that and from each other, in the length of the inner tubular portions $k'$ and $l'$, and also in their diameters, so that when in their relative positions, or "nested," they will (as shown in Figs. 3 and 11,) be concentrically arranged and have their working surfaces in one plane, and in working relation to the one locking stud. Each of these rings has its own gating, and false notches, as appropriately designated thereon by the same letters of reference, as have been employed in connection with the working ring which is connected with the hasp horn base. Although these three working rings are similar, when mechanically considered, they differ radically as to their numbers, numerals and registering line marks as in some prior locks; the ring $i$, having eight numerals or divisions, the ring $k$, nine numerals, and the ring $l$ ten numerals, and said rings have correspondingly varied line marks, these being in full lines, and half lines as shown, although quarter lines may if desired be used for confusing uninitiated parties. The full line, and the half line marks, have each a corresponding interior notch, which may be occupied by the lug $i^4$, of its appropriate outer ring, thus providing for numerous variations in adjustment, each ring having in its flange, twice as many lug notches, as there are false notches at the working face of the ring.

The lock as shown, is set to be opened on 2—5 and 7½, the latter being on the bottom ring, and when these are registered with each other, no other two numbers will be in line with each other, whereas in all prior locks known to me the registration of any one set of numbers, results in a registration in sets, of all the others.

It will be seen that by having both the hasp, and the hasp horn, rotative, the base of the latter can serve as a working ring. Also, that by having all of the working rings in common relation to one locking stud, uneven wear of the rings is not only practically obviated but "feeling" for registering relations, between the stud and the gating of either ring, is rendered practically impossible, and hence this feature of my invention is available, if two or more working rings bear upon one locking stud, regardless of the character of other working rings in the same lock. Also, that the false notches are conducive to security, by misleading during surreptitious attempts at "feeling." Also, that the hasp shank, being controlled by its spring, will normally cause the locking stud to occupy false notches, or the latter and gatings, so as to prevent the rotation of the working rings when the lock is in use, except by those sufficiently familiar with the lock, to enable them to release the rings by depressing the hasp shank, regardless of whether the hasp and its shank be longitudinally movable separately, or only movable together. Also, that the organization of the rotative hasp shank, with its locking stud, and with the rotative central tube and base, enables the base to operate practically as a working ring. Also, that the yoke $c$, provides for convenient assemblage of the parts, and for their separation, as when combinations are to be changed. Also, that the one spring $h$, causes the hasp shank to slide outwardly, while the hasp is forced thereby toward, and upon the hasp horn.

It will be obvious, that each of the several parts in the lock already described, is simple in its construction, and comparatively inexpensive.

It will be understood, that all of the various features of my invention, need not be employed in one organization, although it is obvious that the best results will accrue, when my complete invention is embodied in any one lock—as, for instance, the employment of portions of my invention in another of my improved locks is illustrated in Fig. 16, wherein the working rings have no false notches, and the hasp shank $m$ is not movable longitudinally independently of the hasp; the spring $h^2$ occupies a recess $h^3$ in the base of the lock, and it abuts against the end of the shank, and therefore the hasp $C^2$, is not forced by said spring toward the hasp horn $C^3$, but whenever the locking stud $f'$, is released by the working rings, the lock flies open, the stop stud $f^2$, engaging with the yoke $c$, as before described, preventing the undue withdrawal of the hasp shank. When I employ working rings having false notches, in this variety of my lock, I provide for a slight free space between the hasp base and the underlying ring, and a sliding capacity, at the tenon connection $d'$.

Having thus described my invention, I claim as new and desire to secure by Letters Patent—

1. In a permutation padlock, the combination substantially as hereinbefore described, of a hasp horn projecting from a base which is rotative independently of the body of the lock, and a hasp which is rotative independently of the hasp horn, and is movable longitudinally toward and from said horn.

2. In a permutation padlock, the combination of a hasp horn projecting from, and forming a part of, a working ring, and a hasp which is rotative and longitudinally movable with respect of said horn, substantially as described.

3. In a permutation padlock, the combination substantially as hereinbefore described, of a hasp having a hasp shank, rotative within the hasp, and a slotted tube containing the shank and rotative therewith.

4. In a permutation padlock, the combination substantially as hereinbefore described, of a hasp shank, having a radially projecting locking stud, and working rings, two or more of which have bearing surfaces which co-operate in controlling said locking stud.

5. In a permutation padlock, the combination with working rings having false notches, of a hasp having a shank provided with a locking stud, and controlled by a spring, which when the lock is in use, holds said stud in said false notches, and prevents the rings from being rotated, until released by an appropriate movement of said stud.

6. In a permutation padlock, the combination of a hasp having an independently movable shank, provided with a locking stud; working rings provided with the usual gating, and also with false notches; and a spring for actuating the hasp shank and the locking stud toward and into said false notches, whereby while the lock is in use, the rings will be non rotative, until released by depressing the hasp shank, independently of the hasp substantially as described.

7. In a permutation padlock, the combination substantially as hereinbefore described, of a hasp having a rotative and longitudinally movable shank provided with an appropriate radial locking stud; a central rotative slotted tube, containing said shank, and working rings concentric with said tube, whereby when the gatings in the several rings have been made to register, the slotted tube may be rotated for rotating the shank, and registering the locking stud with the gatings of the working rings.

8. In a permutation padlock, the combination substantially as hereinbefore described, of a rotative and longitudinally movable hasp, and a hasp horn, said hasp and horn having bases which engage with each other, and are locked against independent rotation while occupying the same plane.

9. In a permutation padlock, the combination substantially as hereinbefore described, of a central tube having a suitable base, a series of working rings concentric with said tube, a hasp shank which is longitudinally movable in said tube, and a clip or yoke which detachably engages with said central tube near its top, for confining the working rings in position, and also affording a stop for preventing the undue retraction of the hasp shank.

10. In a permutation padlock, the combination of a hasp having a shank longitudinally movable with reference to the hasp; a spiral spring encircling a portion of the shank, occupying a chamber within the hasp, and abutting at its two ends respectively against shoulders on the hasp and shank, substantially as described.

HARVEY C. LOWRIE.

Witnesses:
PHILIP F. LARNER,
HOWELL BARTLE.